Dec. 5, 1950   H. C. HAGEDORN   2,533,165
CONTAINER FOR INJECTION MEDICINES
Filed April 4, 1947

INVENTOR.
HANS CHRISTIAN HAGEDORN,
BY
ATTORNEYS.

Patented Dec. 5, 1950

2,533,165

UNITED STATES PATENT OFFICE 2,533,165

CONTAINER FOR INJECTION MEDICINES

Hans Christian Hagedorn, Gentofte, Denmark, assignor to Nordisk Insulinlaboratorium, Gentofte, Denmark, a corporation of Denmark Application April 4, 1947, Serial No. 739,520
In Denmark March 22, 1946

2 Claims. (Cl. 128—272)

Liquid compositions designed for administration hypodermically are frequently put up in ampoules or vials having a closure in the form of a cap or stopper which, at least in part, is composed of a membrane of rubber or other elastic material adapted to be readily punctured by a hypodermic needle and to contract and close the opening formed by the needle after the latter is withdrawn. It is highly important that the membrane pierced by the hypodermic needle possess adequate self-closing properties not only to prevent escape of unused contents of the container but also to prevent their contamination. While closures embodying an elastic membrane of the type described are generally satisfactory from the standpoint of utility they, and the operation of applying them, are relatively expensive.

It is the object of my invention to produce a container which can be simply and economically manufactured, which will include an elastic membrane readily perforatable by a hypodermic needle, and from which the membrane cannot be removed.

In carrying out my invention, I form the container, or at least a part of the container, as a molded hollow body of a synthetic plastic, a portion of the wall of such container being formed by a perforatable insert of rubber or similar elastic material, such insert being molded in place in the forming of the container or container-portion containing it. Desirably, the insert is prestressed in such a way that internal stresses within it will assist in closing any opening left by withdrawal of a hypodermic needle. The container is initially formed with an open end which, after the container has been filled, is closed with any suitable type of closure.

Figure 1:
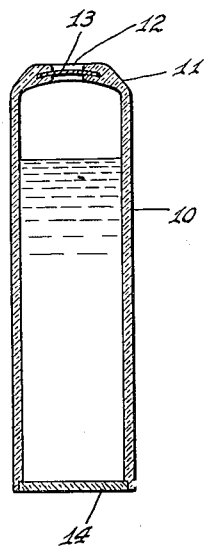
Figure 2:
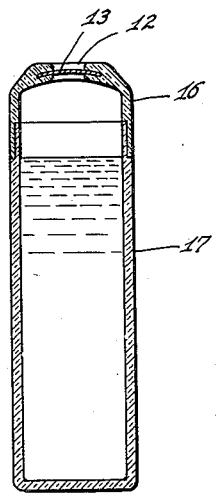

In the accompanying drawing, Figs. 1 and 2 are longitudinal sections respectively through two different forms of container embodying my invention.

The container illustrated in Fig. 1 comprises a hollow cylindrical body 10 having at its top an end wall 11 provided with a central opening 12. The container-body as so far described, with its lower end open is molded of any suitable type of synthetic plastic material, desirably a transparent material, which will not be objectionably affected by or which will not objectionably affect the material which the container is to contain. The opening 12 in the end wall 11 of the container is closed by a membrane or diaphragm 13 of flexible, elastic material, such as a natural or synthetic soft rubber. Such diaphragm is conveniently a disc of uniform thickness of material ally greater diameter than the opening 12 and is cast in place in the molding of the container-body with its periphery extending well into the material of the end wall 11 outwardly beyond the circumference of the opening 12.

By properly shaping the mold-parts which engage the diaphragm 13 and hold it in place during the molding operation, the diaphragm may be strained in such a manner as to promote the closing of an opening left by withdrawal of a hypodermic needle. In the container shown in Fig. 1, the diaphragm was strained into a dished condition to be convex outwardly, thereby introducing compressive stresses into the material of the diaphragm adjacent its inner surface. After a hypodermic needle which has punctured the diaphragm is withdrawn, the prestressed inner portions of the diaphragm 13 readily close the opening to prevent escape of any liquid remaining in the container as well as to prevent contamination of such liquid from an outside source.

The container as above described is filled while in inverted position with the liquid it is to contain, and its open end is then closed in any convenient manner. In the particular container shown in Fig. 1, the open lower end of the container is provided with a counterbore for the reception of a closure disc 14 which may be held in place in any desired manner, as through the medium of a mere press fit or by being cemented or fused in place.

In the modification of the invention shown in Fig. 2, the diaphragm 13 constitutes an insert in a molded plastic cap 16 adapted to serve as a closure for the open upper end of a container 17. Conveniently, the container 17 and its cap 16 interfit telescopically and may be secured together, as by cementing, after the container 17 has been filled.

Apparatus and methods for the injection and compression molding of synthetic plastic articles with metal or other rigid inserts are well known, and in general the same methods and apparatus may be employed in producing a container embodying my invention even though the insert is flexible instead of rigid.

Containers embodying my invention are economical to manufacture in that the elastic closure may be an inexpensive, plain disc of elastic material. The elastic diaphragm can not be removed from association with the container, and its presence in place therefore indicates that the container has not been tampered with in any way which might result in contamination of its contents.

I claim as my invention:

1. A container for injection medicines, comprising a hollow body at least a portion of which is an integral synthetic plastic molding provided with an opening in its wall, and a perforatable diaphragm of elastically compressible material extending across said opening and having its periphery embedded in the plastic container-wall to form a closure, said diaphragm when in position being elastically flexed whereby there are created in that portion of one of its faces exposed in said opening internal compressive forces tending to seal any opening made in the diaphragm.

2. A container for injection medicines, comprising a hollow body at least a portion of which is an integral synthetic plastic molding provided with an opening in its wall, and a perforatable diaphragm of elastically compressible material extending across said opening and having its periphery embedded in the plastic container-wall to form a closure, said diaphragm when in position being elastically dished whereby there are created in that portion of one of its faces exposed in said opening internal compressive forces tending to seal any opening made in the diaphragm.

HANS CHRISTIAN HAGEDORN.

REFERENCES CITED

The following references are of record in the file of this patent:

UNITED STATES PATENTS

| Number | Name | Date |
|---|---|---|
| 808,567 | McManus | Dec. 26, 1905 |
| 2,069,380 | Moore | Feb. 2, 1937 |
| 2,290,348 | Moule | July 21, 1942 |
| 2,364,126 | Cantor et al. | Dec. 5, 1944 |